INVENTOR.
Dorsey Davidoff,
BY
H. H. Loscke
Att'ys.

United States Patent Office 3,405,336
Patented Oct. 8, 1968

3,405,336
SERVO REPOSITIONING CIRCUIT IN A SERVO-MOTOR DRIVE SYSTEM FOR COMPENSATING SERVOMOTOR OVERTRAVEL
Dorsey Davidoff, Fort Lee, N.J., assignor, by mesne assignments, to the United States of America as represented by the Secretary of the Navy
Filed Apr. 7, 1965, Ser. No. 446,440
13 Claims. (Cl. 318—18)

ABSTRACT OF THE DISCLOSURE

A servo repositioning circuit coupled to a servomotor system having a potentiometer varied with servomotor rotative movement and coupled to a memory device to produce an analog voltage corresponding to servomotor overtravel after stop signal which analog overtravel voltage is switched by the servomotor stop signal to reverse the rotative direction of the servomotor by an amount to compensate for the overtravel and return the servomotor to the position it was when the stop signal was applied.

Background of the invention

This invention relates to a servo repositioning system and more particularly to a circuit for sensing the overtravel of a servo motor driving a radar antenna or a radar tuning means in scanning oscillations which is stopped in a scan mode upon the occurrence of a target echo signal to reposition the servo motor back to the position it was during the scan mode at the instant of the target signal.

In the known radar type antenna scanning systems using servo motor drive and follow-up means, the servo motor will drive the antenna or tuner in periodic scan oscillation until a target signal is echoed back to the antenna at which time the servo motor system driving the antenna or radar tuner is abruptly cut off and a brake applied to stop the servo motor drive system as quickly as possible. If the servo motor could be stopped instantaneously upon the occurrence of a target echo, the antenna should have that target directly along its centerline or optical axis. However, the servo motor having a rotative inertia will overtravel or overdrive after being cut off and a brake applied which will induce an overtravel error in the radar antenna receiving circuits to the amount that the antenna has overtraveled or passed the target. Where the radar system has tracking capabilities, this error in overtravel of the antenna must be compensated for or corrected in the target tracking circuits.

Summary of the invention

In the present invention this overtravel of the servo motor system, following the occurrence of a target, is corrected by a repositioning circuit coupled in conjunction with the antenna scanning circuits to correct for this overtravel by returning or repositioning the servo motor system such that the target will be on the antenna axis. This is accomplished by utilizing a memory device which remembers the precise position of the antenna, or more correctly the servo motor drive, at the instant a target signal appears. This memory device also remembers the speed of the overtravel which is established in an error signal output of the memory device through a lead amplifier circuit which is switched in circuit with the servo motor and amplifier of the servo system to reverse the servo motor the precise amount of its overtravel to reposition the antenna so that the target will appear precisely along the antenna axis. It is therefore a general object of this invention to provide a circuit for incorporation in a servo motor radar antenna driving system to reposition the servo system when it changes from a search mode to a target tracking mode to correct for servo motor overtravel in the transition between the modes.

Brief description of the drawings

These and other objects and the attendant advantages, features, and uses will become more apparent to those skilled in the art as the description proceeds in more detail when considered along with the accompanying drawings in which.

Description of the preferred embodiment

Figure 1:
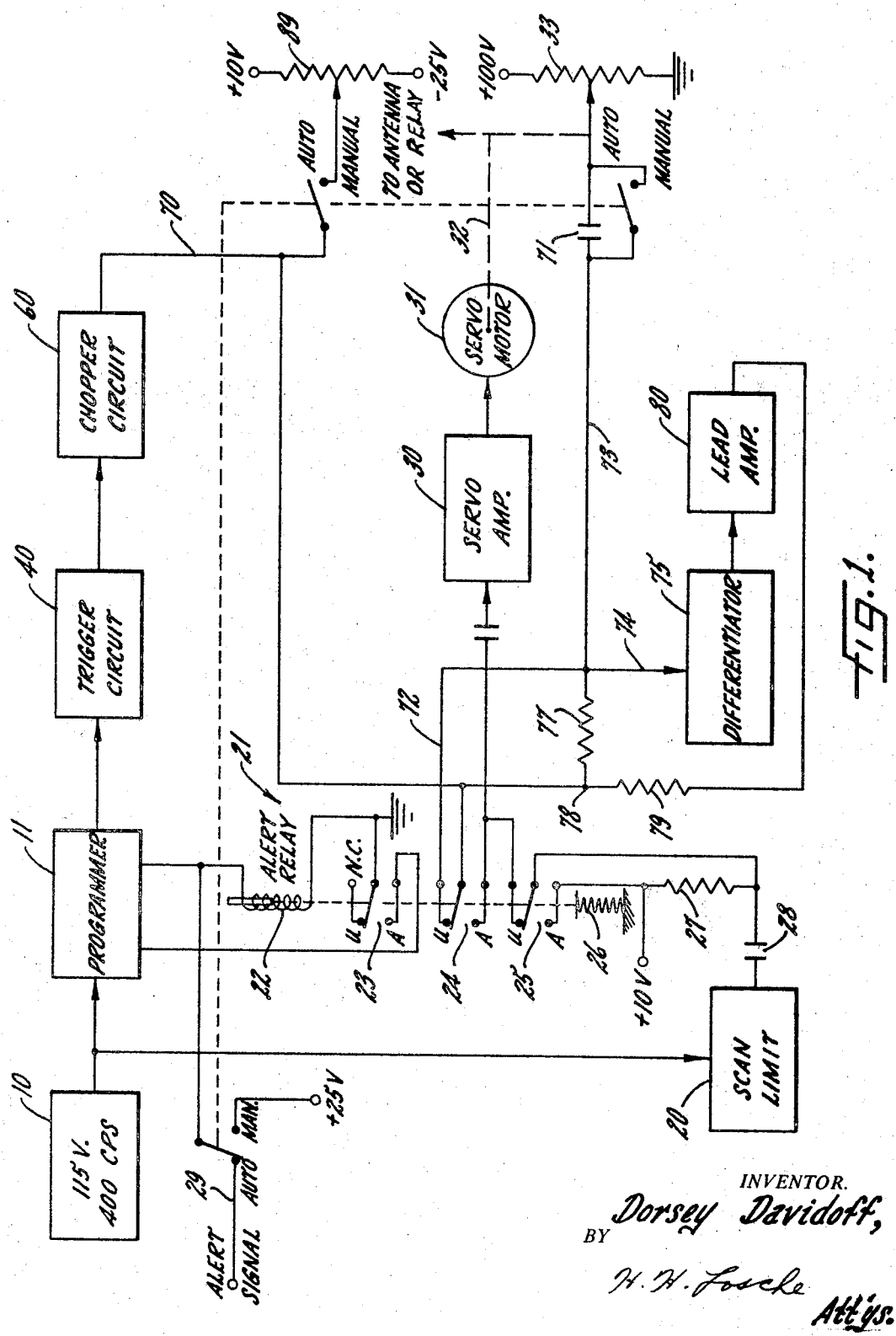
FIGURE 1 is a partially schematic and block circuit diagram of the repositioning circuit incorporated in a servo antenna drive system.

Referring more particularly to FIGURE 1, an alternating current voltage source which, for the purpose of example, may be 115 volts, 400 cycles per second, such as shown in block 10, and may be used as the driving energy source for the servo motor antenna drive system. The voltage source 10 is coupled to a programmer 11 later to be described in connection with the servo repositioning circuit. The output of the voltage source 10 is also coupled to a scan limit circuit 20, such as a modulating means to produce alternate polarity amplitude modulations on the voltage source 10, the output of which is coupled through an alert relay switch 21 to a servo amplifier 30. The alert relay switch 21 has an electromagnetic actuator 22 for actuating a plurality of switches 23, 24, and 25. The switches 23 through 25 are coupled as a gang to the armature of the alert relay actuator coil 22 and are biased by a spring or other equivalent means 26 to the U position being the unenergized or unalert position of the switches. The scan limit circuit is capacitor coupled through 28 to the switch blade of the alert relay switch 25, the energized or alert pole A of this switch being coupled to a voltage source of 10 volts with the 10 volt source being coupled through a resistor 27 to the switch blade of the switch 25. In the unenergized position of the alert relay 21 the switch blade of switch 25 will be at its U contact, this contact being capacitor coupled to the servo amplifier 30. The servo amplifier 30 is coupled to a servo motor 31 having its shaft 32 mechanically coupled to drive an antenna or the radar tuner (not shown) and also the movable tap of a follower potentiometer 33 having its resistance element coupled between a positive voltage source and ground. The voltage source for potentiometer 33 is shown to be 100 volts herein, for the purpose of example, although other voltages may be necessary or required for different systems. One end of the alert relay actuator coil 22 is coupled to an alert signal source by way of the conductor means 29 and its opposite terminal is coupled to a fixed potential such as ground. In the absence of an alert signal representative of a target echo signal returned by the radar system, the voltage source 10 will drive the servo motor 31 through the scan limit circuit 20 and the servo amplifier 30 through the switch 25 resting in its unenergized or U position. The modulation in the scan circuit 20 will drive the servo motor 31 forward and backward at some scanning rate, for example, two seconds per scan which, at the same time, will drive the adjustable tap of potentiometer 33 up and down its resistance element from zero to 100 volts. This operation is of the general type of driving system for the antenna scanning circuits of a radar. Upon the radar receiving a target echo signal through its antenna this will produce an alert signal over the conductor means 29 of sufficient voltage to energize the alert signal relay 21 to switch the switch blade of switch 25 to the alert A contact. In the usual system when this circuit from the scan limit 20 to the servo motor 31 is broken, the servo motor is electrodynamically braked to stop the antenna drive as quickly as possible. Although this braking circuit is applied very rapidly, the time consumed for the servo motor to stop rotation as well as the time consumed by the operation of the switches of the alert relay 21, the antenna has been sufficiently overdriven to produce an error in the radar system.

In this invention a circuit is incorporated in the above described circuit to cause the servo motor to reposition back to the point it was at the instant of receiving the alert signal. A programmer 11 is coupled to the output of the voltage source 10, to the alert signal input 29 and to the A contact of switch 23 in the alert relay 21. In the absence of an alert signal the programmer 11 will block the voltage from the alternating current voltage source 10 and will have a constant direct current low voltage on its output. Upon the occurrence of an alert signal over the conductor 29 energizing the alert relay 21, the programmer 11 will be conditioned to pass positive excursions of the alternating current voltage directly to its output, as will later become clear in the description of this circuit in FIGURE 2. The programmer 11 has its output coupled to a trigger circuit under the condition of the low voltage output of the programmer 11 to produce a constant voltage on the trigger circuit output to a chopper circuit 60. The chopper circuit, under this condition, will produce a constant fixed voltage reference on its output conductor 70 which is coupled to the switch blade in the switch 24 of the alert relay 21. In the unenergized condition, or U switched condition of switch 24, conductor 70 is directly connected to one plate of a memory capacitaor 71 by way of conductors 72 and 73. The opposite plate of the memory capacitor 71 is directly connected to the adjustable tap of the potentiometer 33. The junction of conductors 72 and 73 is coupled by way of conductor means 74 as an input to a differentiator circuit 75 being in the input circuit of a lead amplifier 80. The terminal junction of conductors 72 and 73 is also coupled through an adding resistor 77 to a terminal point 78 and the output of the lead amplifier 80 is also coupled through an adding resistor 79 to the terminal point 80. The terminal point 78 is also coupled to the conductor 70 and the switch blade of the switch 24 in the alert relay 21. Under the search mode of operation, the alternating current voltage source 10 is operative through the scan limit circuit 20 and the switch 25 to the servo amplifier 30 and servo motor 31 to drive the antenna and the follower potentiometer 33 in its scanning oscillations. At the same time the programmer blocks the passage of the alternating current voltage source 10 and switches the trigger circuit 40 to produce a voltage output to the chopper 60 to apply the chopper reference voltage on the output conductor 70 to one plate of the memory capacitor 71 while the opposite plate of this memory capacitor 71 has a varying voltage applied to it from the follower potentiometer 33. When an alert signal is received, switching the alert relay 21, the servo motor 31 has the circuit thereto broken as is the circuit from the chopper output of the reference voltage to one plate of the memory capacitor 71. Also, when an alert signal is received, the programmer 11 immediately passes positive excursions of the alternating current voltage from source 10 to trigger the trigger circuit at a frequency of the source 10 to produce a chopping operation of the reference voltage by the chopper 60 at the frequency of the source 10. The output of chopper 60 is applied through the switch blade of the switch 24 to the alert contact A and the servo amplifier 30 to drive the servo motor 31 in the reverse direction in accordance with an error voltage provided from the memory capacitor 71 to the terminal point 78. This error voltage from the memory capacitor 71 is added to the differentiated and amplified error voltage coming from the differentiator 75 and lead amplifier 80 through the resistors 77 and 79 to terminal point 78. This error voltage will be of a polarity, amplitude, and duration to reposition the servo motor 31 back to the position it was when the alert signal first appeared, as will be made clear in a description of FIGURE 2 of the several blocked components in FIGURE 1.

Figure 2:
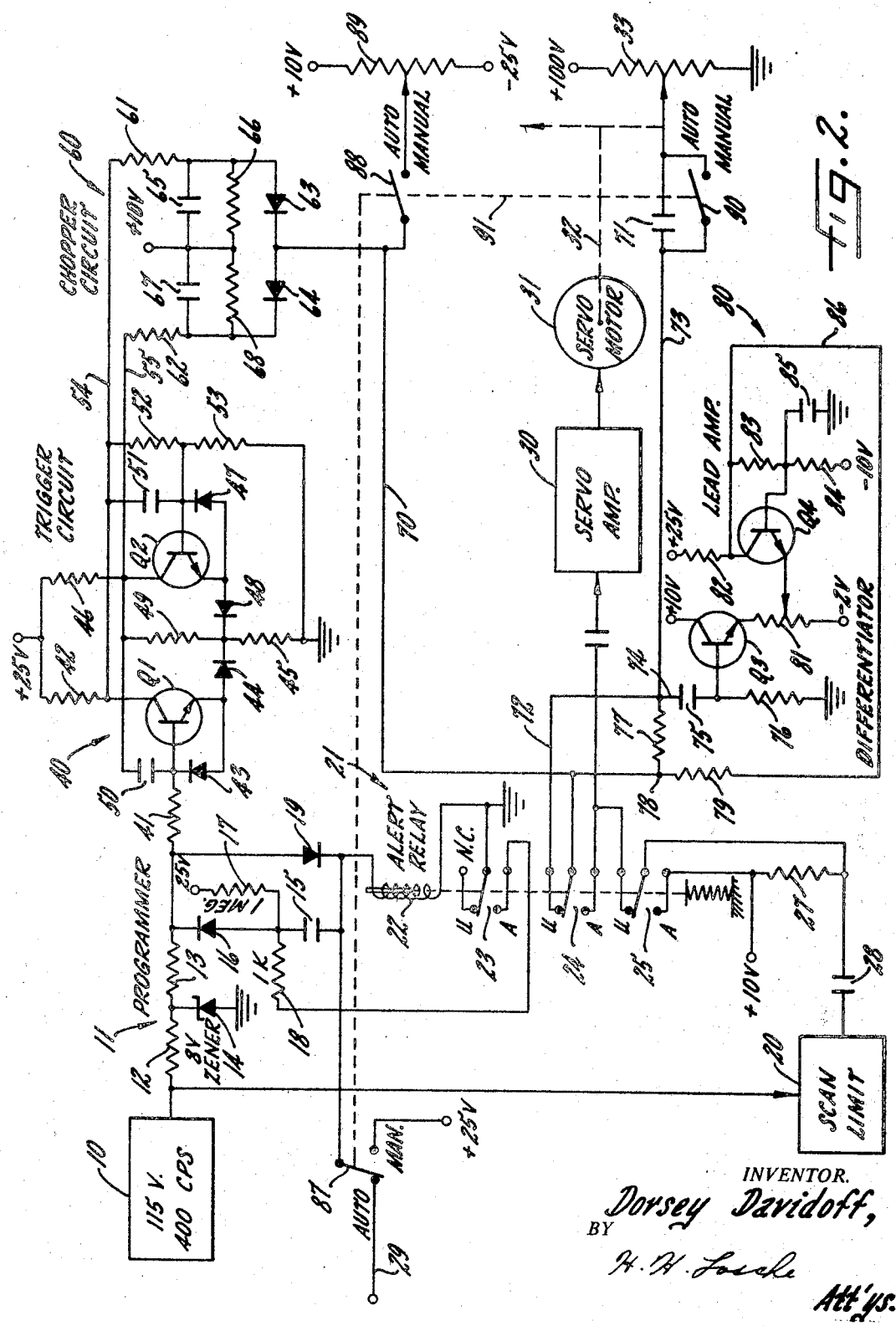
FIGURE 2 is a schematic circuit diagram of the blocked-in circuits shown in FIGURE 1.

Referring more particularly to FIGURE 2, where like reference characters apply to like parts in FIGURE 1, the programmer 11 is coupled to the voltage source 10 through a resistor 12. The resistor 12 is coupled in series with a resistor 13, the coupling of resistors 12 and 13 being to the cathode of a Zener diode 14 having its anode coupled to a fixed or ground potential. The Zener diode is shown herein as being an 8 volt Zener diode, for the purpose of example, although Zener diodes of other voltage limits may be used, where appropriate. The conductor 29 for the alert signal is coupled through a capacitor 15 and a diode 16 to the output side of the resistor 13 which is resistor coupled to the trigger circuit 40. The diode 16 is oriented with its anode coupled to the capacitor 15 and its cathode coupled to the terminal point of resistor 13. The terminal point of capacitor 15 and diode 16 is coupled through a high resistance 17 to a voltage source, such as 25 volts shown as an example herein, and this terminal point is also coupled through a low resistance 18 to the A contact of the switch 23 in the alert relay 21. A diode 19 has its anode coupled to the terminal point of diodes 16 and resistor 13 and its cathode coupled to the conductor 29 for the alert relay signal. This coupling of the output of the programmer 11 through the diode 19 is also to ground through the alert relay actuator coil 22. In the absence of an alert signal over conductor 29 the switch blade of the switch 23 in the alert relay 21 will rest on its U contact leaving the A contact open whereby the voltage from the voltage source through the resistor 17 will be conducted through the diodes 16 and 19 and the alert relay actuator 22 to ground to place a constant low voltage output on the output conductor of the programmer circuit 11 to the trigger circuit 40. This low current through the high resistance 17, illustrated for an example of operation as one megohm, is not sufficient to actuate relay 21. Upon the occurrence of an alert signal over the conductor 29, this alert signal will be of sufficient voltage amplitude to energize the coil 22 of the alert relay 21 to switch the switch blade of the switch 23 to the A contact thereby shorting out the voltage at the terminal point of the resistors 17 and 18 rendering the voltage source applied through the resistor 17 ineffective. The voltage source 10 now will be applied through the programmer to the trigger circuit 40 but will have its positive excursions limited by the 8 volt Zener diode 14 and its negative excursions clipped. The alternating current voltage attempting to pass through the diode 19 will be blocked by the inductance of the actuator coil 22 in the alert relay. The positive excursion under this mode of the programmer will be applied to the input of the trigger circuit 40.

The output of programmer 11 is coupled through a resistance 41 to the trigger circuit 40, this input through the resistor 41 being to the base of a transistor Q1. The transistor Q1 has its collector coupled through a collector load resistor 42 to a collector voltage supply, shown herein to be 25 volts for the purpose of example. The emitter of transistor Q1 is coupled to its base through a diode 43 and through a diode 44 and a resistor 45 to the fixed or ground potential. A transistor Q2 has its collector coupled through a collector load resistor 46 to the collector load supply and its emitter coupled through a diode 47 to its base and through a diode 48 and the resistor 45 to ground. The junction of diodes 44 and 48 is coupled through a resistor 45 to ground. The junction of diodes 44 and 48 is coupled through a resistor 49 to the collector of transistor Q2 and through a capacitor 50 to the base o ftransistor Q1. The base of transistor Q2 is coupled through a capacitor 51 to the collector of transistor Q1. The base of transistor Q2 is also biased from a voltage divider consisting of resistors 52 and 53 from the collector voltage source through resistor 42 to ground. Two outputs are taken from the trigger circuit 40, one output 54 being taken from the collector of transistor Q1 and another output 55 being taken from the collector of transistor Q2. Whenever the programmer output is of a constant low voltage, this low voltage on the base of transistor Q1 will hold this transistor in a cutoff condition producing a high collector voltage on the output 54 which is transmitted through the resistor 52 to the base of transistor Q2 placing this transistor in full conduction. Full conduction of transistor Q2 will pull its collector voltage down to near zero across the resistor 46 thereby placing a low voltage on the output conductor 55. When the programmer 11 output applies the positive excursions of the voltage source 10 to the base of transistor Q1, transistors Q1 and Q2 will alternate in conduction corresponding to the frequency of the voltage source 10. For example, the first positive excursion raising the potential of the base of transistor Q1 immediately will place this transistor into conduction dropping the voltage on the collector thereof which is conducted by way of the capacitor 51 to the base of transistor Q2 to cut this transistor Q2 off immediately. The output of the trigger circuit 40 will then have a low voltage on output 54 and high voltage on output 55. As this positive excursion from the programmer 11 passes, transistors Q1 and Q2 will again reverse conduction which will be repeated at a frequency of the source 10. Capacitors 50 and 51, as well as the diodes 43 and 47, insure rapid conduction changes of the transistors Q1 and Q2. It may be noted that the trigger circuit 40 is similar to a Schmitt trigger in that the emitters are coupled in common through a common emitter resistor to a fixed potential such as ground.

The outputs of the trigger circuit 40 by way of conductors 54 and 55 are through resistors 61 and 62, respectively, to the anode of a diode 63 and the cathode of a diode 64, the cathode of diode 63 and the anode of diode 64 being coupled to the common terminal lead output 70. A reference voltage source, herein shown as being 10 volts for the purpose of example, is coupled in parallel through a capacitor 65 and a resistor 66 to the anode of diode 63 while this voltage source is likewise coupled in parallel through a capacitor 67 and a resistor 68 to the cathode of diode 64. When the trigger circuit 40 is in a quiescent state where the programmer 11 is supplying a constant low voltage thereto, the high voltage on the output 54 and a low voltage on the output 55 will forward bias the diodes 63 and 64 producing a current from the 25 volt source through the resistor 42 over conductor 54 through diodes 63 and 64 and the collector and emitter path of transistor Q2 to ground. Forward biasing of the diode 63 and 64 will place the 10 volt source in the chopper circuit in conduction through the resistors 66 and 68 and through the diode 63 and 64 to the output conductor 70 thereby placing a 10 volt potential on the left plate of the memory capacitor 71 through the switch 24 by way of the U contact. When the programmer 11 changes its mode to apply the positive excursions of the source 10 to the trigger circuit 40, the voltages on the outputs 54 and 55 of the trigger circuit 40 will be alternating in values at the frequency of the source 10 to forward bias and back bias the diodes 63 and 64 at this same frequency. Accordingly, diodes 63 and 64 will chop the voltage source 10 in the chopper circuit 60 at the frequency of the voltage source 10. Since the chopper circuit will operate in the chopper mode only upon the occurrence of an alert signal, the alert relay 21 will throw all switches whereupon the output from the chopper circuit 60 over the conductor means 70 will be conducted as an input to the servo amplifier through the contact A of switch 24.

The differentiator circuit 75 consists of a capacitor 75 and a resistor 76 coupled from the conductor 74 to ground. The junction of the capacitor 75 and resistor 76 of the differentiator circuit is coupled directly to the base of a transistor Q3 in the lead amplifier 80. The collector of transistor Q3 is coupled directly to a collector voltage source and the emitter is coupled through the resistance element of a potentiometer 81 to a negative voltage source, herein shown to be —2 volts for the purpose of example in operation, as will be described, infra. The adjustable tap of the potentiometer 81 is directly coupled to the emitter of the transistor Q4 having its collector coupled through a load resistor 82 to a positive collector voltage source. The base of transistor Q4 is biased in a voltage divider circuit consisting of resistors 83 and 84 coupled between the collector terminal and the negative voltage source, herein shown to be —10 volts for the purpose of example. The base of transistor Q4 is also coupled to one plate of a capacitor 85, the opposite plate of which is grounded. The output of the lead amplifier is taken from the collector terminal of the transistor Q4 over the output conductor 86 to the resistor 79 and is controlled in amplification by the potentiometer 81. The transistors Q3 and Q4 are normally conducting such that any positive or negative voltage swing will be differentiated in accordance with the time constant of the differentiator circuit 75, 76 to amplify this positive or negative voltage swing. The voltage across the memory capacitor 71 during the scan mode of operation is exactly equal to the servo follower potentiometer voltage from 33, minus 10 volts. At the instant of the alert signal over the conductor 29 the voltage of the memory capacitor 71 is equal to the servo follower potentiometer voltage at the time the servo motor 31 stops minus the servo follower potentiometer voltage at the instant of the alert, minus 10 volts. Accordingly, as the potentiometer movable tap of 33 is driven by the servo motor upward or downward, at the time the alert signal is applied over the conductor 29 the positive going or negative going voltage in that interval, from alert signal to stoppage of the servo motor, will be added through the resistor 77 to this same error voltage that is differentiated and amplified in the differentiator 75 and lead amplifier 80 through the resistor 79 to terminal point 78. This error voltage from terminal point 78 will modulate the chopped voltage coming from the chopper circuit 60 over the conductor 70 in amplitude and polarity and for a time duration to cause the servo motor 31 to reverse and reposition itself thereby repositioning the potentiometer 33 at the exact point at which it was when the alert signal occurred. As the potentiometer 33 is brought to rest at its repositioned position, the error voltage disappears and, accordingly, the summed voltage at terminal 78 will disappear so that the servo motor 31 will remain still.

Where it is desirable to remove the automatic control of the repositioning system, switches may be placed at particular points in the circuit so that the system may be repositioned manually. For this purpose a switch 87 may be placed in the conductor 29 for the alert signal which is normally resting on its automatic contact A*u* The opposite terminal of switch 87 has a contact coupled directly to a voltage source, herein illustrated as 25 volts, this position of the switch 87 being the manual position M*a*. A second switch 88 couples the conductor 70 to the movable tap of a potentiometer 89, the resistance element of which is coupled across a voltage source, herein illustrated as being from +10 to —25 volts. Switch 88 is normally open so that the output of the potentiometer 89 is ineffective in the circuit. A third switch 90 is placed in parallel with the memory capacitor 71 and is normally open in its automatic A*u* position but may be closed to shunt out the memory capacitor 71 in its manual M*a* position. Switches 87, 88, and 90 are coupled to gang relation by the operator 91 such that when the operator 91 switches the three switches to the M*a* position a voltage similar to the alert signal is applied over the conductor 29, the memory capacitor 71 is rendered ineffective, and the voltage of an amplitude and polarity, normally supplied by the memory capacitor 71, will now be supplied by the manual adjustment of the adjustable tap on potentiometer 89.

Operation

In the operation of the device let it be assumed that no alert signal is present and that the alternating current voltage from the source 10 is being modulated in the scan limit circuit 20 in alternate positive and negative modulation excursions which is applied through the U contact of switch 25 to the servo amplifier to drive the servo motor in forward and reverse rotative oscillations producing antenna scan in azimuthal or elevational scanning oscillations or to drive a radar tuner in forward and reverse oscillations. In the absence of an alert signal the programmer 11 conducts voltage from its 25 volt source through the diode 19 and the actuator coil 22 of the alert relay 21 directly to ground since the inductance of the coil 22 does not block a direct current voltage. The output of the programmer 11 is therefore a low enough voltage to hold the trigger circuit 40 in its quiescent state in which transistor Q1 is cut off and transistor Q2 is conducting. This quiescent state of the trigger circuit 40 produces a high voltage on its output 54 and low voltage on its output 55 to forward bias the diodes 63 and 64 in the chopper circuit 60. This enables the 10 volt source in the chopper circuit to be conducted over the output 70 through the switch 24 U contact directly to the left plate of the memory capacitor 71. The voltage on the right plate of the memory capacitor 71 is varying up and down in accordance with the scan oscillations produced by the servo motor 31.

Upon the occurrence of an alert signal over the conductor means 29, the alert relay 21 will switch its switches 23 through 25 to the alert contacts A. This shorts out the voltage source in the programmer 11 allowing the positive excursions to the extent limited by the Zener diode 14 to pass through the programmer to the trigger circuit 40. This places the trigger circuit in its triggering mode at the frequency of the voltage source 10 which causes the chopper circuit 60 to chop the 10 volt source therein over the output 70 through the switch 24 contact A to the servo amplifier 30. At the instant of the alert signal 29 the voltage reference of 10 volts being applied over the conductor 70 through the switch 24, upper contact U, to the left plate of the memory capacitor 71 is immediately cut off. Any overtravel of the potentiometer 33 will produce an output over the conductor 73 back from the memory capacitor 71 to add through the resistance 77 to terminal point 78 with the differentiated and amplified output from the lead amplifier 80 over the conductor 86 and the resistor 79 to the terminal point 78. Assuming that the servo motor 31 was driving the potentiometer upward, or in a voltage increasing direction, the time between alert and stop will produce a positive output from the memory capacitor 71 which is operative through the differentiator 75, lead amplifier 80, and adding circuit 77, 79 to modulate the chopped voltage on the conductor means 70 with a positive polarity to cause the servo motor 31 to reverse the direction in which it was going to drive the potentiometer downward, or in a voltage decreasing manner, to the voltage point at which it was when the alert signal occurred. On the other hand, if the servo motor 31 was driving the potentiometer downward in the scan mode when the alert signal occurred, the output of the memory capacitor 71 will be a negative voltage which will modulate the chopped voltage over the conductor means 70 from the chopper circuits 60 with a negative amplitude corresponding to the error voltage determined by the memory capacitor 71. The output of the chopper circuit 60, then, is proportional to the servo follower potentiometer 33 error voltage from its position at the instant of alert plus the signal proportional to velocity. This latter signal is used for servo compensation to reposition the servo motor 31 and potentiometer 33. The servo motor system driving the antenna of the radar accordingly will be repositioned where it was at the instant that the alert signal was applied. This will remove the error of overtravel of the servo system driving the antenna when a target is encountered.

While many modifications and changes may be made in the constructional details and features of this invention and while other voltages may be used different than shown for the purpose of example herein, it is to be understood that I desire to be limited in the spirit of my invention only by the scope of the appended claims.

I claim:
1. A servo repositioning circuit for a servo system having a servo motor driving the adjustable tap of a potentiometer, a voltage source coupled through a scan circuit and a servo amplifier to said servo motor to drive same in forward and reverse oscillations, the invention which comprises:
   a reference voltage;
   a memory means coupled between the adjustable tap of said potentiometer and said reference voltage for memorizing the voltage on said adjustable tap at time when said reference voltage is disconnected;
   a lead amplifier;
   a differentiating network coupling said memory means to said lead amplifier to amplify any changes in said memory means by overtravel of said servo motor after disconnection of said reference voltage;
   a chopper circuit coupled to said reference voltage to chop said reference voltage, said chopper circuit being programmed by said voltage source and said alert relay, said voltage source being alternating current to drive said chopper when an alert signal is present and being ineffective to drive said chopper in the absence of an alert signal; and
   an alert relay actuatable by an alert signal, said relay coupled and arranged to connect said scan circuit to said servo amplifier and to disconnect said chopper circuit from said reference voltage in the absence of an alert signal, and to disconnect said scan circuit from said servo amplifier and connect said chopper to said reference voltage and to said servo amplifier to apply said chopped reference voltage to said servo amplifier along with the lead amplifier output in the presence of an alert signal to reposition said potentiometer to the memorized voltage at the instant of the alert signal to correct for servo motor travel after the occurrence of the alert signal.

2. A servo repositioning circuit as set forth in claim 1 wherein:
   said chopper circuit driven by said alternating current voltage source is through a trigger circuit to trigger said chopper into conductive and nonconductive states.

3. A servo repositioning circuit for a servo system having a servo motor driving the adjustable tap of a potentiometer together with an antenna, an alternating current voltage source coupled through a scan limit circuit and a servo amplifier to said servo motor to drive same in forward and reverse oscillations, the invention which comprises:
   a differentiator network and lead amplifier having an input thereto and an output therefrom;
   a memory capacitor having one plate coupled to the adjustable tap of said potentiometer and the other plate coupled to said differentiator network and lead amplifier input;
   an alert signal input;
   an alert relay, having a plurality of relay switches, coupled to said alert signal input and energizable by an alert signal;
   a chopper circuit having a voltage source therein and control electrodes thereon to apply the voltage of said voltage source on an output thereof under a quiescent condition of said chopper and to apply a chopped voltage of said voltage source on said output during chopper operation, said chopper output being coupled through one of said alert relay switches to said other plate of said memory capacitor;

a trigger circuit having an input and outputs, said outputs being coupled to said control electrodes of said chopper circuit to trigger said chopper circuit to its quiescent and chopper operation conditions;

a programmer network coupled between said alternating current voltage source and said trigger circuit, said programmer having an input from said alert signal input to cause said programmer to set said trigger circuit to control said chopper to rest in its quiescent condition in the absence of an alert signal and to cause said chopper circuit to be activated into its chopper operation when an alert signal is present; and an adding network coupled to add the voltage from said other plate of said memory capacitor and the voltage output of said lead amplifier at a terminal point, said terminal point being coupled through another of said alert relay switches to said servo amplifier to reposition said potentiometer adjustable tap through said servo motor to correct for overtravel of said servo motor after the appearance of an alert signal whereby the potentiometer will provide a true voltage output at the instant of an alert signal.

4. A servo repositioning circuit as set forth in claim 3 wherein:

said scan limit circuit is couplde to said servo amplifier through another of said relay switches to break the circuit of said scan limit circuit to said servo amplifier during the presence of an alert signal.

5. A servo repositioning circuit as set forth in claim 4 wherein:

said chopper circuit includes a pair of diodes that are forward biased through the control electrodes in the quiescent condition and are forward and reversed biased in alternate periodic sequence through the control electrodes during chopper operation.

6. A servo repositioning circuit as set forth in claim 5 wherein:

said trigger circuit includes a pair of transistors that are alternately conductive through collector load resistors, said collectors each being coupled to one each control electrode of said chopper circuit.

7. A servo repositioning circuit as set forth in claim 6 wherein:

said lead amplifier includes a pair of transistors coupled in a circuit with the resistance of a potentiometer loading the emitter of one of the transistors and a resistor loading the collector of the other transistor, and with the adjustable tap of said potentiometer being directly coupled to the emitter of said other transistor, the input being to the base of said one transistor and the output being from the collector of said other transistor.

8. A servo repositioning circuit as set forth in claim 7 wherein:

said programmer network includes a diode in said coupling to said alert signal input and a D.C. voltage source coupled through a diode to said input of said trigger circuit, said D.C. voltage source being coupled to one contact of a set of normally open alert relay switch contacts to short out said D.C. voltage source during the presence of an alert signal on said alert signal input whereby said D.C. voltage overrides the effect of said alternating current voltage source to hold said trigger circuit in a state to retain said chopper circuit in its quiescent condition in the absence of an alert signal, and whereby said D.C. voltage is shorted out and said alternating current voltage source is effective to trigger said trigger circuit to place the pair of transistors therein in alternate periodic conduction.

9. A servo repositioning circuit for a servo system having a servo motor driving the adjustable tap of a first potentiometer together with a radar tuner, an alternating current voltage source coupled through a scan limit circuit and a servo amplifier to said servo motor to drive said first potentiometer and tuner in forward and reverse oscillations, the invention which comprises:

a lead amplifier having an input with a differentiator network coupled thereto and an output;

a memory capacitor having one plate coupled to the adjustable tap of said first potentiometer and the other plate coupled to said lead amplifier input;

an adding network coupled to add the voltage on said other plate of said memory capacitor and the voltage output of said lead amplifier at a terminal point;

an alert signal input;

an alert relay having a plurality of switches and having an actuator coupled to said alert signal input energizable by an alert signal to switch said plurality of switches from a first position to a second position, one of said alert relay switches being in the coupling of said scan limit circuit to said servo amplifier to connect same in said relay switch first position;

a chopper circuit having a D.C. voltage source coupled thereto and two control electrodes to apply the D.C. voltage source to an output thereof during a quiescent state of said chopper circuit and to apply a chopped D.C. voltage from said D.C. voltage source on said output during a chopper operation condition, said chopper output being coupled through a second of said alert relay switches to said other plate of said memory capacitor in said first position of said alert relay switch and being coupled to said servo amplifier through said second of said alert relay switches when said relay switch is in its second position, the second position of said second alert relay switch also coupling said terminal point to said servo amplifier;

a trigger circuit having an input and two outputs, said two outputs being coupled respectively to each of said two electrodes of said chopper circuit to trigger said chopper circuit to its quiescent state and to its operation condition;

a programmer network coupled between said alternating current voltage source and said trigger circuit input, said programmer network having an input coupled to said alert signal input to cause said programmer network to set said trigger circuit to control said chopper circuit to rest in its quiescent state during the absence of an alert signal and to cause said chopper circuit to be activated into its chopper operation during an alert signal, said programmer network having a control terminal coupled through a third alert relay switch to control same in its two program conditions;

a second potentiometer having a voltage coupled across a resistance thereof and an adjustable tap coupled to the output of said chopper circuit; and a gang of two normally open and one normally closed switches coupled, respectively, across said memory capacitor, serially in said coupling of said second potentiometer and chopper circuit output, and serially in said alert signal input, said normally closed switch in said alert signal input having an alternate contact to which a voltage is applied matching the alert signal voltage whereby the memory capacitor will memorize the voltage of the movable tap of said first potentiometer to provide an error signal of a change in voltage from the instant an alert signal is applied to the voltage of rest after overtravel by said servo motor, which error signal is added in said adding circuit and applied to said servo amplifier as a modulation of said chopped D.C. voltage output of said chopper circuit in the second position of said alert relay switches to return said adjustable tap of said first potentiometer to the precise voltage position it was at the instant the alert signal occurred.

10. A servo repositioning circuit as set forth in claim 9 wherein:

said lead amplifier includes two NPN transistors with the emitter and collector of one coupled across a voltage supply through an emitter load resistance of a third potentiometer, with the collector of the other transistor coupled through a collector load resistor to a supply voltage and the emitter coupled to the adjustable tap of said third potentiometer, with the base of said one transistor providing the input, and with the collector of said other transistor providing said output.

11. A servo repositioning circuit as set forth in claim 10 wherein:

said chopper circuit includes a pair of diodes oriented from said D.C. voltage source to be forward biased through said two control electrodes to connect said D.C. voltage source to said output and forward and reversed biased in repeated cycles by control voltages on said control electrodes to chop said D.C. voltage source.

12. A servo repositioning circuit as set forth in claim 11 wherein:

said trigger circuit includes two NPN transistors having the collectors thereof each providing one each of said two outputs, the base of one providing said input, and the base of the other biased by the collector of said one transistor to hold said transistors in an alternate state of conduction and nonconduction when a constant voltage is applied to the base of said one transistor to hold said chopper circuit in its quiescent state, and to cause said trigger circuit to periodically reverse in alternate transistor conduction and nonconduction when an alternating current voltage is applied to the base of said one transistor to cause said chopper circuit to chop said D.C. voltage of said D.C. voltage source.

13. A servo repositioning circuit as set forth in claim 12 wherein:

said programmer network includes a diode coupling the output thereof with said alert signal input in the low resistance direction, a second D.C. voltage supply coupled through a resistor and a diode to said programmer network output with the juncture of said resistor and diode being coupled to said control terminal to cause said programmer network to block the application of said alternating current voltage source to said trigger circuit when no alert signal is present by conducting said second D.C. voltage supply to said programmer network output, and to connect said alternating current to said programmer network output when an alert signal is present by shorting out said juncture of said resistor and diode through said third alert relay switch.

References Cited

UNITED STATES PATENTS

| | | |
|---|---|---|
| 2,456,573 | 12/1948 | White et al. |
| 2,528,017 | 10/1950 | Stanton. |
| 2,890,401 | 6/1959 | Stevens et al. _____ 318—270 |
| 3,080,513 | 3/1963 | Edwards. |
| 3,110,851 | 11/1963 | Plogstedt et al. |

BENJAMIN DOBECK, *Primary Examiner.*